United States Patent [19]
Berezhnoi et al.

[11] 3,981,462
[45] Sept. 21, 1976

[54] AIR-CUSHION LANDING GEAR FOR AIRCRAFT

[76] Inventors: Igor Alexandrovich Berezhnoi, ulitsa Tukhachevskogo, 253, kv. 18; Albert Ivanovich Elatontsev, ulitsa Sovetskoi Armil, 163, kv. 61; Vladimir Vasilievich Ignatiev, prospekt Kirova, 293, kv. 40, all of Kuibyshev; Djuis Danilovich Ivlev, prospekt Mira, 184, kv. 2, Moscow; Boris Veniaminovich Mayanov, ulitsa Gagarina, 27, kv. 2, Kuibyshev; Vasily Andriyanovich Svinukhov, ulitsa Fizkulturnaya, 98a kv. 2, Kuibyshev; Vladimir Petrovich Kuzmin, ulitsa Sovetskoi Armil, 200, kv. 16, Kuibyshev; Igor Alexandrovich Evdokimov, prospekt Kirova, 212, kv. 39, Kuibyshev, all of U.S.S.R.; Boris Alexeevich Zhidkov, deceased, late of Kostromskoi Pereulok, 8, kv. 26, Kuibyshev, U.S.S.R., by Ljudmila Vasilievna Zhidkova, administratrix

[22] Filed: May 15, 1975

[21] Appl. No.: 577,781

Related U.S. Application Data
[63] Continuation of Ser. No. 493,732, July 31, 1974, abandoned.

[52] U.S. Cl. ............................ 244/100 A; 180/124; 180/128; 244/101; 244/110 H
[51] Int. Cl.² .......................................... B64C 25/54
[58] Field of Search ............ 244/103 R, 105, 100 R, 244/100 A, 110 E, 23 R, 12 R; 180/116, 117, 119, 121, 124, 125, 126, 127, 128; 188/5; 115/1 R

[56] References Cited
UNITED STATES PATENTS

| | | |
|---|---|---|
| 3,004,737 | 10/1961 | Boyle et al. ........................ 244/105 |
| 3,209,848 | 10/1965 | Holloway ............................ 180/121 |
| 3,275,270 | 9/1966 | Earl et al. ........................ 244/110 E |
| 3,297,280 | 1/1967 | Lee .................................... 180/124 |
| 3,330,384 | 7/1967 | Bertin et al. .................... 180/119 X |
| 3,458,007 | 7/1969 | Todd .................................. 180/124 |
| 3,467,343 | 9/1969 | Violleau ............................ 244/105 |
| 3,561,558 | 2/1971 | Parkhouse ........................ 180/124 |
| 3,595,336 | 7/1971 | Perez ................................ 180/128 |
| 3,698,507 | 10/1972 | Meriano ............................ 180/124 |
| 3,812,804 | 5/1974 | Nagata et al. .................... 115/1 R |

*Primary Examiner*—George E. A. Halvosa
*Assistant Examiner*—Galen L. Barefoot
*Attorney, Agent, or Firm*—Holman & Stern

[57] ABSTRACT

The invention relates to aircraft and more particularly an air-cushion landing gear comprising a system of landing gear units suspended from an aircraft, with at least two of the units being spaced transversely with respect to the longitudinal axis of the aircraft, and one of them being arranged on the axis ahead of the aircraft center of gravity; each landing gear unit comprises a platform with an annular inflatable cell attached to its underside and used, when inflated, as a flexible curtain circumscribing an air cushion space under the platform, the inflation of each cell and the formation of the air cushion is accomplished by an independent injecting device built in the platform; the spaced-apart cells are provided with an operating device for decelerating and controlling the movement of the aircraft on the runway surface; such a design of the air-cushion landing gear makes it possible to easily and rapidly adapt modern planes and helicopters to such a landing gear with the take-off, landing and taxiing techniques being similar to those used with conventional wheeled landing gears; in addition, the proposed landing gear is more economical and simpler in manufacture and in service as compared to those of the prior art.

13 Claims, 7 Drawing Figures

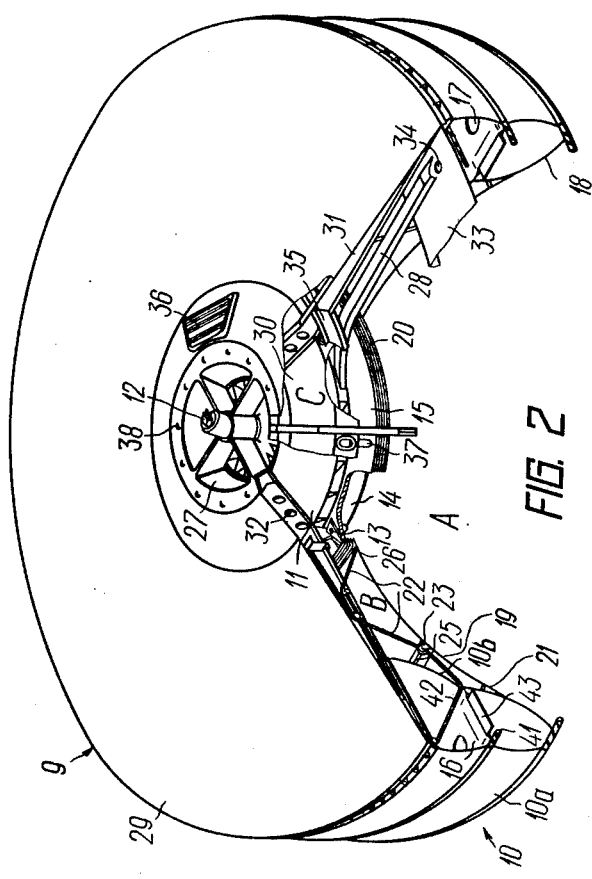
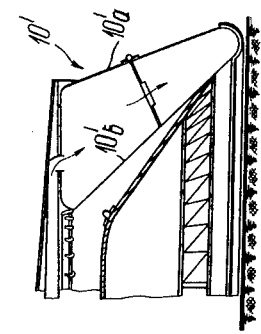
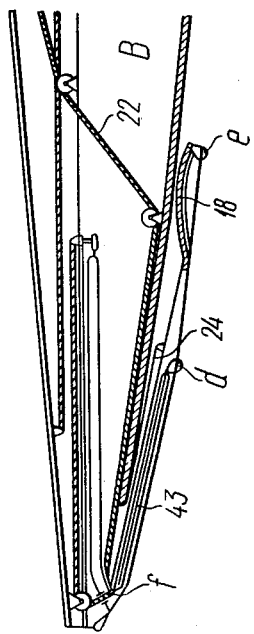

AIR-CUSHION LANDING GEAR FOR AIRCRAFT

This is a continuation of application Ser. No. 493,732 filed July 31, 1974, now abandoned.

FIELD OF THE INVENTION

The invention relates to aircraft engineering and, more particularly, to an air-cushion landing gear for aircraft.

The present invention can most advantageously be applied to light and medium aircraft designed to operate on semi-prepared or unprepared ground airfields (including marshy and sandy ones) and snow-covered airfields.

Moreover, the invention may be partially or fully applied to heavy aircraft.

However, since in certain cases modern helicopters should be capable of taking off and landing with a ground run similar to that of conventional aircraft, the term "aircraft" as used herein is also intended to relate to helicopters.

BACKGROUND OF THE INVENTION

Known in the art are aircraft air-cushion landing gears (cf. the air-cushion landing gear for the amphibious aircraft "La-4" of the "Bell Aerosystems" company (USA), and U.S. Pat. No. 3,275,270) comprising one or two units in the form of elastic inflatable cells secured to the underside of the fueslage in the symmetry plane of the aircraft.

If the landing gear is composed of a single unit, its only cell is located near the centre of gravity. In a two-unit version, one of the cells is arranged in the same manner as in the one-unit version with the second unit being located in front of the first one.

Each inflatable cell is, in plan view, on a generally annular configuration extended longitudinally and, when inflated, serves as a flexible curtain confining open spaces therewithin under the aircraft fuselage, supplied thereto is compressed air by means of injecting or compressor devices to create an air cushion under the aircraft for sustaining the latter in air in close proximity to the runway surface of an airfield during take-off, running and taxiing.

Compressed air is supplied to form the air cushion primarily through orifices or slots in the bottom portion of each cell. In this case, air is supplied successively by the injecting devices first to the cavities of the inflatable cells proper, then to form the air cushions.

It should also be noted that with two inflatable cells each injecting device feeds air simultaneously to both cells and the cavities of these cells communicate with each other.

The deceleration of the aircraft running on the landing gear by employing the air cushion effect is accomplished either through friction between the runway surface and the bottom portions of the inflatable cells contacting therewith during deceleration, or by means of inflatable high-pressure balloons circumscribing the bottom portions of the cells.

The controllability of the aircraft during take-off run, landing run and taxiing on an airfield is accomplished by varying the value of the braking forces provided by said high-pressure balloons on the left- and right-hand sides of the inflatable cells.

The retraction of the inflatable cells in flight takes place in the prior-art landing gears due to the elastic properties of the materials from which they are made. After compressed air supply is cut off, the cells are pressed or collapsed against the surface of the aircraft's fuselage.

The prior-art air-cushion landing gears suffer from a number of disadvantages of which the most serious are as follows:

the employment of inflatable cells of a longitudinally extended shape deteriorates the conditions of "maintaining" the air cushion as the cells approach the runway surface and deflect during landing at a particular angle of pitch, thereby reducing the operational efficiency of the air cushion as a landing impact-attenuation system.

The latter disadvantage is aggravated by the absence of longitudinal sectioning of the cavities of the air cushion and the inflatable cell (cf. the landing gear of the "La-4" aircraft) which not only decreases the lift of the cushion proper and lowers the vertical stiffness of the cell as its rear portions deflect when the aircraft is in the above-mentioned position, but can also substantially alter the function of the aircraft's nosing down during landing as compared to the same process in the case of an aircraft with a conventional wheeled landing gear.

In a landing gear where the air cushion is divided into two spaces (cf. U.S. Pat. No. 3,275,270), the aforementioned disadvantages are partially eliminated due to the pneumatic communication between the inflatable cells confining the air cushion.

The shape and design features of the cells under consideration, the air cushions confined therebetween and the system of supplying air to both impose certain restrictions on the possibilities of optimizing the type and completeness of the diagram of dynamic deflection of the air-cushion landing gear units.

The above reasons for decreasing the vertical and moment stiffness of the landing gear units in the two considered diagrams with the track of these landing gears being considerably narrowed, call for a certain reduction in the transverse restoring moment during landing with a ground roll. It should also be noted here that the effective width (the width along the lines of contact between the curtain and the runway surface at zero hover height and the air cushion area) are inconsistent with the large transverse dimensions of the prior-art inflatable cells, as well as with their dimensions in plan, and the resulting mid-section, surface dimensions and weight of the cells.

Finally, to provide for allowable clearance between the elements of the aircraft structure and the runway surface during a maximum landing deflection of the rear portions of the cells (with the above-described designs of these cells, methods of their sectioning and supply of compressed air), a need arises to considerably increase the pressure in the cells with respect to the pressure in the air cushions or to increase the height of the cells along the entire perimeter with respect to the required height in case the aircraft moves on the landing gear with zero angles of pitch (e.g. while taxiing on an airfield).

However, an increase in pressure in the cells is associated with an appropriate increase in the output of the injecting devices, and an increase in the height of the cells, with an increase in their dimensions and the mid-section, both increases involving a greater weight of the landing gear structure.

A serious disadvantage of the prior-art air-cushion landing gears also lies in the system of supplying compressed air to the air cushion spaces when all or almost all air from the injecting devices is pumped through the cavities of the inflatable cells and further through numerous openings in the lower portions of each cell to their air cushion spaces. Such a system, as well as the need to compensate for losses in relatively long air ducts (cf. U.S. Pat. No. 3,275,270) require a considerable increase in the drive output of the injecting devices and in their weight.

Such air supply to the air cushions is also characterised by the following disadvantage manifesting itself in service: since aircraft equipped with landing gears of the considered type are intended to be used on semi- or unprepared airfields, a large amount of soil, snow or water will inevitably work into the inflatable cells, which may eventually lead to the clogging or freezing of the openings through which air flows to the air cushion spaces.

It should be remembered that these openings are also used to supply air to the area of contact between the cells and the runway surface to reduce the wear thereof in the course of taxiing or, especially, ground roll deceleration of the aircraft. This, however, does not eliminate the necessity of protecting respective portions of the inflatable cells against wear by way of increasing the thickness of the rubber layer and even using metal plates.

Deceleration and control of an aircraft with an air-cushion landing gear by installing special high-pressure balloons on the bottom surface of the inflatable cells inevitably involves increased wear of the balloons due to small areas or friction against the runway surface, hence, high specific pressures in the area of contact therewith. To reduce the wear, those portions of the high-pressure balloons which contact the runway surface are reinforced with metal plates.

In addition, the comparatively small distance between the balloons on the left- and right-hand sides of the cells produces a negative effect on the aircraft controllability as it runs on the landing strip, and their longitudinal spacing along the lateral portions of the inflatable cells and the considerable pivotal moment that is established in this case impair the controllability of the aircraft as it performs a ground turn in position.

The diagram of retracting the inflatable cells in the prior-art landing gears has necessitated the development of a special fabric with anisotropy of elastic properties.

The inadequacy of the prior-art landing gears for parking is another disadvantage thereof. When an aircraft is parked on deflated cells on unprepared airfields, the aerodynamics of the aircraft will noticeably be impaired due to contamination and accretion of snow and ice on the bottom surface of the fuselage and the inflatable cells. Whereas adapting inflatable cells for parking will necessitate appropriate design modifications. In the latter case, there is again the danger of clogging and freezing of the openings through which air is supplied to the air cushion.

It should be noted, in conclusion, that the aforementioned disadvantages of the prior-art air-cushion landing gears rule out the possibility of applying them to the already existing aircraft or those under construction by way of appropriately modifying or perfecting the latter.

SUMMARY OF THE INVENTION

It is an object of the present invention to provide an air-cushion landing gear with such a design of the flexible inflatable cells, such a mutual arrangement thereof and attachment to the aircraft, and such a system of supplying compressed air to the air-cushion spaces formed thereby, that will enable its application to the already existing aircraft in a convenient and easy manner.

Another object of the invention is to provide an air-cushion landing gear that will be more economical and simpler in manufacture and in service as compared to the prior-art air-cushion landing gears.

Still another object of the invention is to provide such an air-cushion landing gear that will make it possible to use take-off, landing and taxiing techniques similar to those employed by aircraft with conventional wheeled landing gears.

These and other objects are accomplished in an aircraft air-cushion landing gear comprising flexible inflatable cells of a generally annular configuration in plan, and injecting devices with drives, which supply compressed air, prior to landing and take-off, to the inner cavities of these cells for inflating them and to the open spaces confined therebetween when they are inflated for providing a lift force that supports the aircraft in close proximity to the runway surface.

The inflatable cells are, according to the invention, attached to the underside of platforms suspended from the aircraft forming therewith individual landing gear units, and the injecting devices are mounted on these platforms, each supplying air to one of the cells and to the open space confined therebetween, with at least two cells, each having at least one inflatable portion, being spaced transversely with respect to the longitudinal axis of the aircraft and having devices for decelerating and controlling its movement on the runway surface, and at least one such unit is arranged on the longitudinal axis of the aircraft ahead of its centre of gravity.

Such an embodiment makes it possible to provide an air-cushion landing gear in the form of a multiunit system, the size, number and arrangement of the units being determined by the weight of the aircraft and its configuration.

This not only provides for an easy adaptation of aircraft to air-cushion landing gears, but also makes it possible under certain conditions to arrange these unified units along the lines of a conventional wheeled landing gear or, what is more, to attach these units to the aircraft structure by means of the struts employed in wheeled landing gears.

Moreover, the application of air-cushion landing gear units in the above arrangement thereof on the aircraft and with independent air supply to each of them, provides for high damping properties of the landing system formed thereby pitch-and-roll stability of the aircraft at the moment of touchdown and during take-off and taxiing on the airfield, as well as a substantial reduction in the capacity of the injecting device system.

The use of landing gear units with braking devices, appropriately spaced on either side of the aircraft fore-and-aft axis in conjunction with a simple system of controlling the moment established by the braking forces relative to the vertical axis passing through the centre of gravity of the aircraft, ensures an effective control of its movement on the airfield, which is particularly essential when the aircraft runs at low speeds and makes a ground turn in position.

In this case, the system of controlling the aircraft in movement can employ any known system of brake or nose wheel control for an aircraft with a wheeled landing gear.

The system can be simplified or remain practically unchanged within the interval from the control wheel or pedals to the point of attachment of the brake control system actuator mounted on respective landing gear units.

In a possible embodiment of the invention, the platform of each landing gear unit and the inflatable cell attached thereto have a circular shape in plan and are mounted coaxially, and the injecting device is a centrifugal fan whose impeller is disposed under the platform in the upper portion of the air-cushion space of the inflatable cell on the axis thereof, and, to supply air to the impeller, the platform is provided with a duct, whereas for the inflation of the inner cavity of the cell, it is connected to branch pipes whose intake ends are arranged in the direction of the air flow thrown off by the impeller of the centrifugal fan; such an embodiment of the cell inflation system makes it possible to supply air compressed to a pressure close to the total pressure built up by the injecting devices, which results in maintaining a pressure in the cell that is always somewhat higher than that in the air cushion space, thereby providing for the required stability of the inflatable cell structure when it interacts with the runway surface, as well as with the air flow in flight.

By selecting the area of the branch pipes when varying the pressure in the air cushion of the inflatable cell in the process of its deflection, it is possible to obtain the required stiffness and, consequently, to optimize effectively the type and completeness of the diagram of its dynamic deflection during landing.

The cell inflation system, according to the invention, does not require any increase in the capacity of the centrifugal fans (designed only to feed air to the air-cushion spaces), because after the cells are inflated to shape and to a required pressure, no air leakage takes place.

Besides, it becomes possible to considerably reduce the power consumed by the fans.

Finally, such a system provides for the self-sealing of the flexible curtain of the air cushion formed by the cells when the former moves over a surface with irregularities of particular sizes; this, on the one hand, reduces the frictional forces arising when the bottom portions of the curtain touch these irregularities, as well as the specific pressure exerted on these portions and, consequently, the wear of the curtain, and, on the other hand, it reduces air consumption by the air cushion, i.e., the power supply.

The self-sealing effect is brought about as a result of an automatic variation in the stiffness and flexibility of the curtain depending on the magnitude and number of irregularities. Such an adaptability of the curtain to the relief or contour of the airfield surface is determined by the communication between the inner cavity of each inflatable cell and the air cushion through feeding branch pipes, and by the head pressure in the injecting device.

When an aircraft moves over an irregular runway, the variation in the air bleeding from the air cushion cavity into the atmosphere causes a variation in the head produced by the fan and in the pressure of the air cushion, which two factors bring about a variation of the pressure in the cell, i.e. a respective variation in the stiffness and flexibility of the cell or, what is the same, of the curtain.

According to one possible embodiment of the inflatable cells, each of them, when inflated, can have an outer cylindrical wall in the form of a truncated conical surface with a larger lower base.

According to another embodiment of the invention, each inflatable cell can be confined from the outside and inside by two walls in the form of two coaxial truncated conical surfaces with a larger lower base, with the diameter of the upper base of the external wall being equal to the diameter of the platform.

The embodiment of the inflatable cell makes for an increase in its wear resistance, because the cell whose theoretical shape is substantially formed by a cylindrical and a truncated cone, has in elevation a shape of a downwardly narrowing trapezium; this increases the flexibility of the curtain when the latter is loaded by drag and transverse forces while it moves over the airfield.

Due to such a shape of the curtain, an air-cushion landing gear unit is provided whose effective width and cushion area practically do not differ from the overall dimensions of the platform, and the transverse dimensions of the inflatable cell are equal to the air cushion width and area.

However, the invention also contemplates a second embodiment of the inflatable cell having a shape of a downwardly narrowing truncated cone and making it possible to increase the air cushion area with the same or a greater mid-section of the platform.

It is expedient that a parking plate be attached to the lower surface of each platform under the impeller of the centrifugal fan.

Large-area parking plates improve considerably the operational characteristics of an aircraft equipped therewith operating on landing strips built on low-strength soils, as well as on marshy, sandy and snow-covered airfields.

To protect the bottom portion of each inflatable cell against wear, it is expedient to provide it with a replaceable tread made of a wear-resistant material.

It is also good practice that flexible annular membranes having openings for the passage of air be provided inside the inflatable cell to stiffen its side walls; this improves the stability of the shape of the inflatable cell when it is acted upon by vertical and horizontal forces.

The above features of the air cushion design of the present invention have made it possible to use easily-pliable materials, i.e., conventional fabrics (in contrast to special fabrics used in the prior-art air-cushion landing gears) which are completely or almost completely gasproof or impervious and possess the strength required for operation under particular climatic conditions.

According to another embodiment of the invention, attached to the inner and outer walls of the inflatable cell are flexibile and stiff elements to facilitate folding of the cell after it has been deflated and press it against the platform; elastic cords secured to the walls of the cell in a prestretched condition can be used as the flexible elements.

In another embodiment, use can be made of cables forcibly pulling the inflatable cell by means of a drive;

this makes it possible to retract the curtain in flight and in the parking area.

The braking device comprises a membrane provided in the air-cushion space of a respective cell and adapted to move along the landing strip, be pressed thereagainst under the effect of excess pressure built up in the air-cushion space above the membrane at the moment of braking and return to the initial position when the pressure is brought down to zero; such an embodiment makes it possible to considerably increase the contact area between the braking membrane and the surface of the landing strip, thereby reducing the specific pressure in the area of their contact almost down to the pressure in the air cushion.

To build up excess pressure above the membrane, the space below it can, at the moment of braking be made to communicate with the atmosphere by means of a branch pipe and a control valve provided in the platform.

The membrane can be made in the form of a ring fastened along its outer perimeter to the inner wall of the inflatable cell, and along its inner perimeter, to the platform, with openings being formed along the periphery of the membrane to interconnect the spaces located above and below the membrane.

The membrane can be secured to the inner wall of the cell by means of cords with the clearances therebetween serving as openings for the passage of air.

The membrane can be made from an elastic material capable of reassuming the initial position due to the elastic properties thereof.

In another embodiment, the membrane can be made from a non-elastic material and can be fastened along its inner perimeter to the platform by means of a flexible corrugated shell bringing the braking membrane to the initial position.

It is expedient to secure annular concentric stiff elements to the upper surface of the membrane with elastic cords being connected to the former and having their other ends fastened to the platform.

The aircraft air-cushion landing gear according to the present invention makes it possible to easily adapt aircraft for use in diverse geographic areas from sandy deserts to polar regions.

In particular, provision is made in the invention for using such landing gears in combination with conventional wheeled undercarriages, thereby additionally improving the operational characteristics of aircraft and involving minimal modifications in the aircraft design when such a landing gear is mounted on commercial aircraft.

It is expedient to use the proposed landing gear with light or private planes, since its design allows for a rapid replacement of the wheeled landing gear by a landing gear utilising the air cushion effect and vice versa in the same manner as wheeled and ski landing gears are interchanged.

It is possible to develop a parametric series of undercarriage designs as is the case, e.g. in the mechanical engineering industry, that can be used, in an appropriate set, in any types of aircraft.

Set forth below is a detailed description of a preferred embodiment of an aircraft air-cushion landing gear with reference to the accompanying drawings, wherein:

BRIEF DESCRIPTION OF THE DRAWING

FIG. 2 is a substantially enlarged partially elevated isometric view, with portions broken away of an air-cushion landing gear unit in the operating position, according to the invention;

FIG. 6 is a partial enlarged view of portion B of FIG. 5; and

FIG. 7 is a fragmentary side elevation view of another embodiment of the inflatable cell, according to the invention.

DESCRIPTION OF PREFERRED EMBODIMENTS

Figure 1:
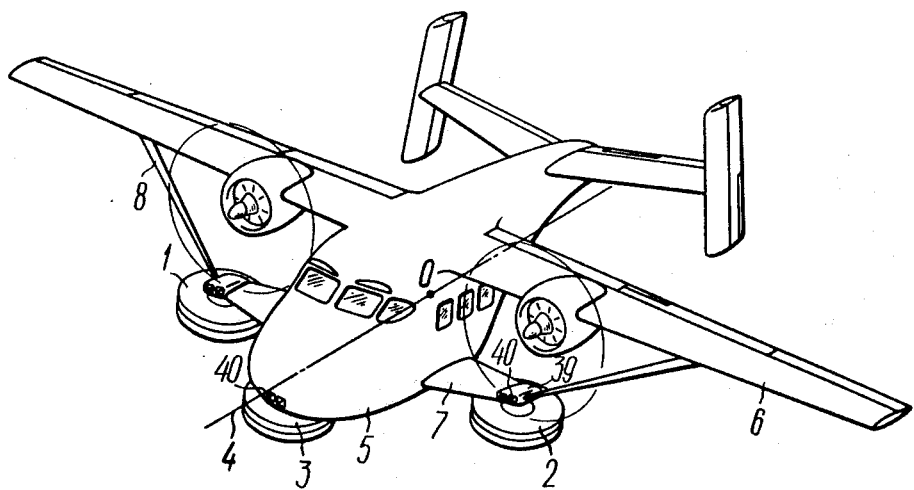
FIG. 1 is a general view of an aircraft with a three-unit air-cushion landing gear, according to the invention.

An air-cushion landing gear for aircraft comprises three units 1, 2 and 3 (FIG. 1) arranged in plan in the same manner as wheeled undercarriages in a conventional landing gear with a nose wheel, i.e. two units 1 and 2 are located near the aircraft centre "0" of gravity and are spaced in the transverse direction symmetrically with respect to the aircraft longitudinal axis 4, and the third unit 3 is shifted forward along the axis 4.

In this case, the units 1 and 2 are secured to a fuselage 5 of the aircraft and to its wing 6 by means of cantilever beams 7 and struts 8 similar to those used in a conventional wheeled landing gear.

Each unit comprises a horizontal circular platform 9 (FIGS. 2–5) with annular inflatable cell 10 attached to the platform in a coaxial arrangement along the periphery of its bottom surface, the cell 10 being used, when inflated, as a flexible curtain circumscribing an air-cushion space under the platform 9.

Built in the centre of each platform 9 is an injecting device in the form of a centrifugal fan whose impeller 11 is disposed under the platform 9 in the upper portion of the air-cushion space of a respective cell 10 and driven by a hydraulic motor 12.

Therewith, according to the invention, the fan supplies compressed air simultaneously to the inner cavity of the inflatable cell 10 to inflate it and to the air-cushion space circumscribed thereby.

A disk-shaped parking plate 14 whose upper surface is formed by skin 15 is fastened to the centre of the platform 9 beneath the impeller 11 of the fan by means of members 13.

Each inflatable cell 10 represents a bag made from a gas-proof (impervious) fabric. This bag is formed, on the outside, by a circular cylindrical wall 10a of essentially a round configuration in plan and, on the inside, by a circular tapered wall 10b shaped in elevation as a downwardly narrowing trapezium. This enhances the wear resistance of the inflatable cell 10 due to improved flexibility of its lower portion when acted upon by external drag and transverse forces during the movement of the aircraft on the airfield.

To provide for a stable shape of the inflatable cell having such a cross-section, the inner cavity of each cell 10 is vertically divided, according to the invention, by a flexible annular membrane 16 into two spaces. The membrane 16 has openings 17 made along the circumference thereof and intended to interconnect said cavities.

The number of such membranes 16 depends on the height of the cell 10.

Each inflatable cell 10' (FIG. 7) can also be made in the form of a downwardly narrowing cone.

Such inflatable cells 10' can be assembled from a plurality of individual interconnected horizontal sections, e.g. in the form of toroidal cells located one above another and clasped together by, for example, lacing or zippers, etc.

In the same manner, treads 18 can be fastened to the underside of each cell 10 and 10', and the inflatable cells 10 and 10', to the platform 9.

Installed in the air-cushion space of each inflatable cell 10 of the spaced-apart units 1 and 2 are braking devices for decelerating and controlling the movement of the aircraft during take-off run, landing run and taxiing; each braking device has a flexible annular braking membrane 19 dividing the air-cushion space or a respective cell 10 into two spaces: the lower, A, and the upper, B.

The membrane 19 is fastened along its inner perimeter to the outer contour of the skin 15 which extends beyond the contour of the parking plate 14 by means of a flexible corrugated shell 20. Each membrane 19 is attached to the inner wall 10b along the inner perimeter by means of an elastic cord 21.

The braking membrane 19 is made from a wear-resistant material or protected against wear on the underside by a replaceable tread (not shown).

To change the position of the membrane 19 in the process of operation of the braking device, use is made of elastic cords 22 whose extension and contraction are improved and the wear at the points of bending is reduced by means of roller-bearing members 23.

To increase, in the course of deceleration, the contact area between the membrane 19 and a runway surface 24 by eliminating the "quilt" effect (occurring in the case of a point wise connection of the elastic cords 22 to the flexible membrane 19), concentric circular stiffening members 25 and 26 are built in the membrane 19.

Each platform 9 incorporates an inlet axial channel 27 through which air is sucked from the atmosphere by the impeller 11 of the fan; further, this air first proceeds, in a compressed state, to the space B of the air cushion of the inflatable cell 10 and then to its lower space A through the openings between the cords 21 and, finally, into the atmosphere through the annular clearance between the tread 18 and the runway surface 24.

The inflation of each cell 10 is effected by the impeller 11 of the same fan through branch pipes 28 interconnecting the space B of the air cushion and the inner cavity of the cell 10. The intake ends of these branch pipes 28 are disposed in the rotational plane of the impeller 11 of the fan in the direction of the air flow (absolute velocity vector of the flow) thrown away by the impeller 11 and at a minimum possible distance from its edge.

Thus, the total air pressure taken up by the branch pipes 28 produces the required pressure differential not only between the inner cavity of the cell 10 and the atmosphere, but also between said cavity and the spaces A and B of its air cushion, thereby providing for a stable shape of the inflatable cell 10 under all operating conditions.

The number of branch pipes 28 and the shape of their cross-section are determined by the time of filling the cell 10 and by the appropriate degree of air bleeding from the cell 10 through the branch pipes 28 as the cell is deflected upon landing.

These parameters are selected so as to provide for the required vertical stiffness of the cell 10.

Axial fans (not shown) can also be used as injecting devices, on condition that in this case, too, the intake ends of the branch pipes 28 be oriented in the direction of the absolute velocity vector of the flow generated by the fan, and be spaced at a minimum possible distance therefrom.

Each platform 9 is made in the form of a thin-walled structure and composed of an upper tapered skin 29 and a bottom annular skin 30 interconnected by radial ribs 31 with openings 32. Fastened to the ribs 31 is an annular plate 33 which, in turn, is secured to the inflatable cell 10.

To prevent particles of soil and snow from penetrating the platform 9, the latter is covered with fabric (not shown) on the underside section between the bottom skin 30 and annular plate 33.

Formed in the annular plate 33 are openings 34 evenly distributed along its circumference, which are (when the required sealing is provided) aligned with respective openings in the upper portion of the cell 10. Coupled to each of these openings 34 is the outlet end of a respective branch pipe 28 through which air is supplied to the inner cavity of the cell 10. The platform 9 is provided with an annular space C confined between the skins 29 and 30, air channel 27 and a cylindrical wall 35.

The annular space C communicates with the atmosphere, through a air control valve 36, and with the lower space A of the air cushion, through the openings in the lower skin 30 of the platform 9 and in the skin 45 by means of branch pipes 37 interconnecting them.

The platform can be made both from metal and non-metal materials, and its individual elements, even from fabrics. It may be of a three-layer structure using any known filler.

Secured to the top of the platform 9 around the inlet channel 27 is a flange 38 by means of which the platform 9 and, consequently, the entire landing gear unit is coupled to the aircraft.

In this case, the front unit 3 is directly coupled to the fuselage 5 of the aircraft, and the spaced-apart units 1 and 2 are coupled via a suspension point 39 to the cantilever beams 7.

Each suspension point 39 is covered with a fairing having air intakes 40 for supplying air to the impeller 11 of the fan.

The air intake 40 for the unit 3 is provided in the fuselage 5.

The landing gear units can be attached by any appropriate known method: from suspension points enabling mounting and dismantling landing gear units in operation to permanent connections when the platform is built in the structure, e.g. of the aircraft fuselage.

In this case, individual platforms of the landing gear units can be interlinked forming a common structure which accommodates a plurality of inflatable cells that can take up any shape deemed expedient from the layout or design considerations.

To retract each of the inflatable cells 10 in flight and in the parking area, provision is made for two circular elastic cords 41 (FIGS. 1 and 2) fastened to the outer surface 10a of the cell 10 along its perimeter at points d and e (FIG. 6), as well as radial elastic cords 42 whose one end is fastened to the inner wall of the cell 10 at point f, and the other end passing through the sealed openings in the upper surface of the cell 10 is attached to the platform 9.

The kinematics of retracting the cell 10 is improved by the cords 22 and plates 43; these plates 43 are arranged in the plane of cords 41 and 42 and fastened to the horizontal annular membrane 19.

Instead of elastic cords 41 and 42 use can be made of cables which, when the inflatable cells are retracted, are forcibly contracted by means of any known drive.

Figure 5:
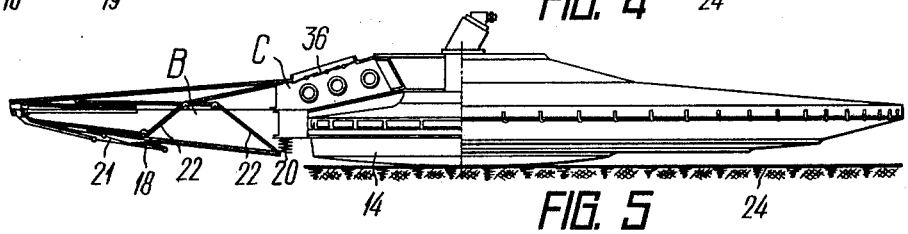
FIG. 5 is a partially elevated view of the landing gear unit of FIG. 4 with the braking device in the retracted position.

The air-cushion landing gear operates in the following manner;

In parking, the aircraft is supported by the runway surface through the parking plates 14, while the inflatable cells 10 of all the landing gear units 1, 2 and 3 and the braking membranes 19 of the units 1 and 2 are retracted (FIGS. 5 and 6).

To set the aircraft in motion, all the hydraulic motors 12 of the injecting devices of all the landing gear units 1, 2 and 3 are simultaneously actuated Subsequently, the operation of the landing gear will be illustrated with reference to an embodiment with the spaced-apart units 1 and 2 being equipped with braking devices.

Each hydraulic motor 12 spins up the impeller 11 of a respective centrifugal fan to supply compressed air through the branch pipes 28 and openings 34 and 17 into the inner cavity of a respective inflatable cell 10, inflating the latter.

The air from the impeller 11 of the fan is simultaneously delivered into the space B of the air cushion above the braking membrane 19 and further through the openings formed by the lacing 21 into the space A of the air cushion below the membrane 19.

With an increase in the air pressure inside the cell, its elastic forces stretch the elastic cords 41 and 42. In this case, the points e and d of the cell 10 are displaced from the centre of the platform 9 radially with respect to the points f. Further, as the cord 42 is being stretched, rigid plates 43 start rotating pulling the annular membrane 16 therewith, so that the points f of these plates 43 and the cell 10 connected thereto are displaced radially with respect to the points d towards the centre of the platform 9 and downwards.

After the impeller 11 of the centrifugal fan has gained the rated rotational speed, the pressure of the compressed air in the spaces A and B of the air cushion of each inflatable cell 10 reaches a value sufficient to provide for a lift force for the aircraft.

Figure 3:
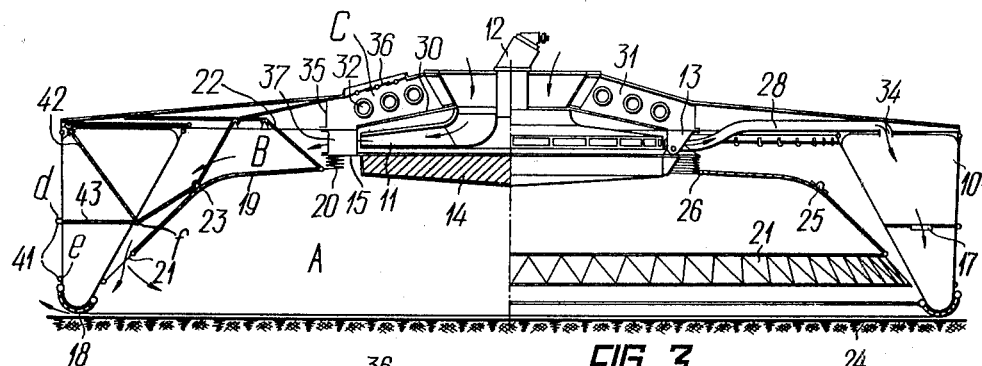
FIG. 3 is a sectional elevation view, on the left of the vertical axis, and a longitudinal section, on the right of the vertical axis, of the landing gear unit of FIG. 2.
Figure 4:
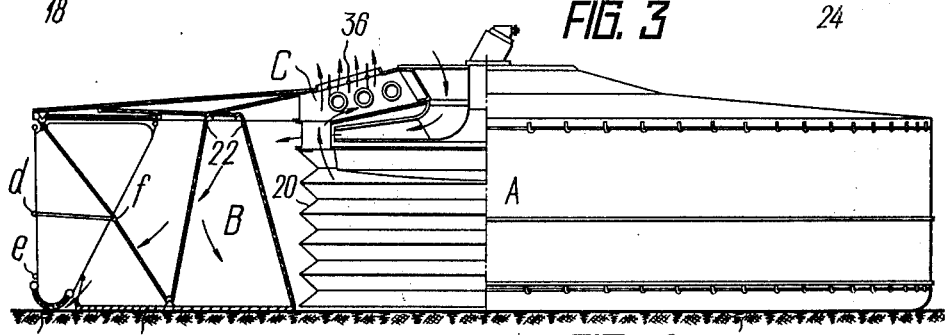
FIG. 4 is a partially sectional elevated side view of the landing gear unit of FIG. 2 with the braking device in the braking position.

The parking plates 14 break away from the runway surface 24 of the airfield, and the inflatable cells 10 and the braking membranes 19 assume the operating position shown in FIG. 3. In this case, the air from the space A of the air cushion of the inflatable cell 10 bleeds through the annular clearance between the tread 18 and the runway surface 24.

Thus, the units 1, 2 and 3 of the air-cushion landing gear sustain the aircraft in air in close proximity to the runway surface 24 of the airfield and enable it to perform controlled motions under the action of the engine thrust and the blown-over rudder surfaces.

Since the landing gear units 1, 2 and 3 are located under the aircraft in the same manner as the wheeled undercarriages of a conventional landing gear, the process of the longitudinal motion of the aircraft during nose lift-off at taking off and nose-dropping at landing is the same as in an aircraft having a conventional wheeled landing gear.

After take-off and after taxiing to the parking area, the drives 12 of the fans are switched off, the pressure in the inner cavities of the inflatable cells 10 and the spaces A and B of their air cushions drops and the elastic forces of the cords 41 and 42 (and partially, of the cords 22) accomplish the folding of the inflatable cell 10.

As this takes place, the cords 22, the corrugated shells 20 of the braking membrane 19 and the inflatable cells 10 assume a shape with a small mid-section, and the aircraft, if it is in the parking area, is lowered on the parking plates 14 as shown in FIG. 5.

In this case, the elasticity of the cords 41 and 42 is selected so that the displacement of the points f of the plates 43 and the membrane 16 is directed upwards radially with respect to the point d at the outset of the process of folding the cell 10.

Under the effect of the elastic forces of the cords 41, the points f are displaced towards the centre of the platform 9 somewhat in advance of the points d and c.

As a result, the flexible cells 10 and their membranes 19 are folded as shown in FIG. 5.

To accomplish the landing of the aircraft, the hydraulic motors 12 are switched on actuating the impellers 11 of the fans which inflate the cell 10 and bring the braking membranes 19 to the operative position, as has been described above, before the aircraft approaches the landing strip.

When each of the inflatable cells 10 approaches the runway surface 24 at a certain distance, an air cushion effect occurs under the platform 9 in the space circumscribed by the cell 10, providing for a lift which continues to be increased as the cell 10 is approaching the runway surface 24.

After the cell 10 has touched the runway surface 24, its rear sections are deflected first, then, when the line of contact between the cell 10 and the surface 24 is closed, the entire cell 10 and the air confined within its inner cavity and in the air cushions spaces are deflected.

Air bleeds from the inner cavities of the cells 10 through the branch pipes 28 into the space B of the air cushion and therefrom, together with the air contained in the spaces A and B of the air cushion through the clearance between the plate 33 and the runway surface 24 and partially, through the inlet channel 27 in the platform 9, into the atmosphere. In this case, the energy of the aircraft landing shock is absorbed due to the bleeding of the air flowing out through the branch pipes 28 and through the impeller 11 of the fan, as well as (if necessary) through the control valve 36, and due to the compression of the air in the cavities of the cells 10 and in the spaces A and B of the air cushion.

The aircraft is decelerated during the landing run and taxiing in the following manner:

a definite size of the openings between the spaces A and B, formed by the cords 21, provides for a certain pressure differential onto the braking membrane 19 when the fan operates.

This pressure differential tends to shift the membrane 19 downwards, however, it assumes, prior to deceleration, the initial position shown in FIG. 3 under the effect of the retaining cords 22 and the corrugated shell 20.

The control valves 36 of the landing gear units 1 and 2 are opened remotely to accomplish deceleration from the cockpit of the aircraft. In this case, the space A of each cell 10 of these units 1 and 2 communicates with the atmosphere (or with the decreased pressure region) through the branch pipes 37 and the space C in the platform 9 and the valve 36, and, as a result, the pressure below the membrane 19 decreases and the increasing pressure differential between the spaces B and A forces the membrane 19 down towards the runway surface 24.

The frictional forces produced at the moment when the membrane 19 touches the surface 24 generate a braking force which can be controlled by the valve 36.

The differentiated control of the valves 36 of the units 1 and 2 makes it possible to provide a control moment about the vertical axis of the aircraft passing through its centre 0 of gravity; this ensures the required maneuverability of the aircraft during its translatory motion and turns.

The possibility of spacing the landing gear units 1 and 2 with braking devices at a great distance from the longitudinal axis 4 of the aircraft provides for an effective control over its movement at low speeds and turns in position when the aircraft cannot be effectively controlled by means of control surfaces.

What is claimed is:

1. An aircraft air-cushion landing gear comprising: landing gear units suspended from said aircraft; at least two of said landing gear units being spaced transversely with respect to the longitudinal axis of said aircraft; at least one of said landing gear units being arranged on the longitudinal axis of said aircraft ahead of its center of gravity; each of said landing gear units being suspended from said aircraft by a separate platform; each of said landing gear units having at least one inflatable cell secured to the underside of said platform; each of said inflatable cells of said landing gear units being of a generally annular configuration in plan and, when inflated, circumscribing an air-cushion space under said platform; injecting devices built in the platforms of said landing gear units; each of said injecting devices supplying compressed air to the inner cavity of one of said inflatable cells for inflating it and to said air-cushion space circumscribed thereby for providing a lift force which sustains the aircraft in close proximity to the runway surface during take-off, landing and taxiing; means for decelerating and controlling the aircraft's movement, provided in at least two of said spaced-apart landing gear units, the platform of each said landing gear unit and the inflatable cell secured thereto being of a generally annular configuration in plan and arranged coaxially, and the injecting device comprises a centrifugal fan whose impeller is disposed under the platform in the upper portion of the air-cushion space circumscribed by the inflatable cell, on its axis, and, to supply compressed air to said impeller, the platform has a through channel, while, for inflating the cell, its inner cavity is coupled to branch pipes whose intake ends are arranged in the direction of the air flow repulsed by the impeller of the fan, the inflatable cell being confined, when inflated, by a cylindrical wall from the outside, whose diameter is equal to that of the platform, and by a truncated conical wall with a larger lower base from the inside, on the side of the air-cushion space, flexible annular membranes being provided inside the inflatable cell, stiffening its side wall and having openings for the passage of air, flexible and stiffening elements being attached to the inner and outer walls of the inflatable cell to facilitate the folding of the cell after it has been deflated to be retracted and pressed against the platform, and elastic cords comprising the flexible elements attached to the walls of the cell in a prestretched condition.

2. An aircraft air-cushion landing grar comprising: landing gear units suspended from said aircraft; at least two of said landing gear units being spaced transversely with respect to the longitudinal axis of said aircraft; at least one of said landing gear units being arranged on the longitudinal axis of said aircraft ahead of its center of gravity; each of said landing gear units being suspended from said aircraft by a separate platform; each of said landing gear units having at least one inflatable cell secured to the underside of said platform; each of said inflatable cells of said landing gear units being of a generally annular configuration in plan and, when inflated, circumscribing an air-cushion space under said platform; injecting devices built in the platforms of said landing gear units; each of said injecting devices supplying compressed air to the inner cavity of one of said inflatable cells for inflating it and to said air-cushion space circumscribed thereby for providing a lift force which sustains the aircraft in close proximity to the runway surface during take-off, landing, and taxiing; means for decelerating and controlling the aircraft's movement, provided in at least two of said spaced-apart landing gear units, the platform of each said landing gear unit and the inflatable cell secured thereto being of a generally annular configuration in plan and arranged coaxially, and the injecting device comprises a centrifugal fan whose impeller is disposed under the platform in the upper portion of the air-cushion space circumscribed by the inflatable cell, on its axis, and, to supply compressed air to said impeller, the platform has a through channel, while, for inflating the cell, its inner cavity is coupled to branch pipes whose intake ends are arranged in the direction of the air flow repulsed by the impeller of the fan, the inflatable cell being confined, when inflated, by a cylindrical wall from the outside, whose diameter is equal to that of the platform, and by a truncated conical wall with a larger lower base from the inside, on the side of the air-cushion space, flexible annular membranes being provided inside the inflatable cell, stiffening its side wall and having openings for the passage of air, flexible and stiffening elements being attached to the inner and outer walls of the inflatable cell to facilitate the folding of the cell after it has been deflated to be retracted and pressed against the platform, and cables comprising the flexible elements to forcibly pull the inflatable cell by means of a drive.

3. An aircraft air-cushion landing gear comprising: landing gear units suspended from said aircraft; at least two of said landing gear units being spaced transversely with respect to the longitudinal axis of said aircraft; at least one of said landing gear units being arranged on the longitudinal axis of said aircraft ahead of its center of gravity; each of said landing gear units being suspended from said aircraft by a separate platform; each of said landing gear units having at least one inflatable cell secured to the underside of said platform; each of said inflatable cells of said landing gear units being of a generally annular configuration in plan and, when inflated, circumscribing an air-cushion space under said platform; injecting devices built in the platforms of said landing gear units; each of said injecting devices supplying compressed air to the inner cavity of one of said inflatable cells for inflating it and to said air-cushion space circumscribed thereby for providing a lift force which sustains the aircraft in close proximity to the runway surface during take-off, landing, and taxiing; means for decelerating and controlling the aircraft's movement, provided in at least two of said spaced-apart landing gear units, the means for decelerating the aircraft comprising a braking membrane disposed in the air-cushion space circumscribed by the inflatable cell and adapted to move from an initial position adjacent the platform to a second position along the runway surface and be pressed thereagainst under the effect of the excess pressure built up in the air-cushion space above the membrane at the moment of braking, the membrane reassuming its initial position when the action of the pressure is discontinued, the space below the braking membrane communicating at the moment of braking, with the atmosphere through a branch pipe and a control valve in the platform to relieve excess pressure below the braking membrane.

4. An aircraft air-cushion landing gear comprising: landing gear units suspended from said aircraft; at least two of said landing gear units being spaced transversely with respect to the longitudinal axis of said aircraft; at least one of said landing gear units being arranged on the longitudinal axis of said aircraft ahead of its center of gravity; each of said landing gear units being suspended from said aircraft by a separate platform; each of said landing gear units having at least one inflatable cell secured to the underside of said platform; each of said inflatable cells of said landing gear units being of a generally annular configuration in plan and, when inflated, circumscribing an air-cushion space under said platform; injecting devices built in the platforms of said landing gear units; each of said injecting devices supplying compressed air to the inner cavity of one of said inflatable cells for inflating it and to said air-cushion space circumscribed thereby for providing a lift force which sustains the aircraft in close proximity to the runway surface during take-off, landing and taxiing; means for decelerating and controlling the aircraft's movement, provided in at least two of said spaced-apart landing gear units, the means for decelerating the aircraft comprising a braking membrane disposed in the air-cushion space circumscribed by the inflatable cell and adapted to move from an initial position adjacent the platform to a second position along the runway surface and be pressed thereagainst under the effect of the excess pressure built up in the air-cushion space above the membrane at the moment of braking, the membrane reassuming its initial position when the action of the pressure is discontinued, the braking membrane being shaped as a ring secured along its outer perimeter, to the inner wall of the inflatable cell and, along the inner perimeter, to the platform, with openings being formed along the periphery of the membrane to interconnect the spaces above and below the membrane, the braking membrane being secured to the inner wall of the inflatable cell by means of cords, and the clearance between these cords serve as the openings for the passage of air.

5. An aircraft air-cushion landing gear comprising: landing gear units suspended from said aircraft; at least two of said landing gear units being spaced transversely with respect to the longitudinal axis of said aircraft; at least one of said landing gear units being arranged on the longitudinal axis of said aircraft ahead of its center of gravity; each of said landing gear units being suspended from said aircraft by a separate platform; each of said landing gear units having at least one inflatable cell secured to the underside of said platform; each of said inflatable cells of said landing gear units being of a generally annular configuration in plan and, when inflated, circumscribing an air-cushion space under said platform; injecting devices built in the platforms of said landing gear units; each of said injecting devices supplying compressed air to the inner cavity of one of said inflatable cells for inflating it and to said air-cushion space circumscribed thereby for providing a lift force which sustains the aircraft in close proximity to the runway surface during take-off, landing, and taxiing; means for decelerating and controlling the aircraft's movement, provided in at least two of said spaced-apart landing gear units, the means for decelerating the aircraft comprising a braking membrane disposed in the air-cushion space circumscribed by the inflatable cell and adapted to move from an initial position adjacent the platform to a second position along the runway surface and be pressed thereagainst under the effect of the excess pressure built up in the air-cushion space above the membrane at the moment of braking, the membrane reassuming its initial position when the action of the pressure is discontinued, the braking membrane being shaped as a ring secured along its outer perimeter, to the inner wall of the inflatable cell and, along the inner perimeter, to the platform, with openings being formed along the periperhy of the membrane to interconnect the spaces above and below the membrane, the braking membrane comprising a non-elastic flexible material and is secured along its inner perimeter to the platform by means of an elastic corrugated shell bringing the membrane to its initial position.

6. A landing gear as claimed in claim 5, including annular concentric rigid elements are attached to the upper surface of the braking membrane, with elastic cords being secured, with one end, to the elements and, with the other end, to the platform.

7. An aircraft comprising a center of gravity and a longitudinal aircraft axis, said aircraft including an air-cushion landing gear comprising a plurality of air-cushion landing gear units, each unit consisting of an inflatable cell which is collapsible after a pressurized air supply is cut off from the cell; and air-injecting means connected to and supplying compressed air into said cell, said cell and said injecting means being arranged on a common platform, at least one of said landing gear units being disposed at the longitudinal aircraft axis, ahead of the center of gravity thereof, at least two of said landing gear units being spaced transversely relative to the longitudinal aircraft axis, at least one of said landing gear units having means for braking and controlling the movement of the aircraft, said means for braking and controlling the movement of the aircraft comprising a braking membrane arranged in the air-cushion for movement toward a support surface for engagement against the support surface under the effect of excess air pressure in the air-cushion above the braking membrane, and valve means connecting the space under the braking membrane to the atmosphere for communicating the space beneath with the atmosphere to permit the membrane to be pressure-urged toward the support surface; the braking membrane being attached to an inner wall portion of the inflatable cells by cords, said cords forming gaps therebetween for the passage of air.

8. A landing gear as claimed in claim 7 including pipes connected to said injecting means, said pipes being directed into said cell, said pipes having intake ends disposed in the direction of an air stream emitted from said injecting means.

9. A landing gear as claimed in claim 7 including a parking plate attached to the underside of each of the platforms.

10. A landing gear as claimed in claim 7 including a replaceable tread of wear-resistant material attached to the underside of the inflatable cells.

11. A landing gear as claimed in claim 7 wherein said inflatable cells include elastic cords attached to the walls of said cells for collapsing the cell when the pressurized air supply is terminated.

12. A landing gear as claimed in claim 7 including cables and power means operatively connected to said cells for assisting in collapsing the cells after the air supply is terminated.

13. A landing gear as claimed in claim 7 wherein the braking membrane comprises a flexible material and is attached at its inner periphery to the platform by an elastic, corrugated shell capable of returning the membrane to an initial, inoperative position.

* * * * *